US012609503B2

(12) United States Patent
Yamashita et al.

(10) Patent No.: US 12,609,503 B2
(45) **Date of Patent: *Apr. 21, 2026**

(54) CONNECTOR DEVICE

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(72) Inventors: Takuya Yamashita, Mie (JP); Tatsuo Hirabayashi, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 686 days.

This patent is subject to a terminal disclaimer.

(21) Appl. No.: 17/802,706

(22) PCT Filed: Mar. 4, 2021

(86) PCT No.: PCT/JP2021/008562

§ 371 (c)(1),
(2) Date: Aug. 26, 2022

(87) PCT Pub. No.: WO2021/177426

PCT Pub. Date: Sep. 10, 2021

(65) Prior Publication Data

US 2023/0092720 A1 Mar. 23, 2023

(30) Foreign Application Priority Data

Mar. 6, 2020 (JP) ................................ 2020-039412

(51) Int. Cl.
*H01R 43/24* (2006.01)
*H01R 13/504* (2006.01)
*H01R 43/02* (2006.01)

(52) U.S. Cl.
CPC ........... *H01R 43/24* (2013.01); *H01R 13/504* (2013.01); *H01R 43/02* (2013.01)

(58) Field of Classification Search
CPC ........... H05K 3/284; H05K 2203/1316; H01R 12/707; H01R 12/724; H01R 13/405;
(Continued)

(56) References Cited

U.S. PATENT DOCUMENTS 7,066,742 B2 * 6/2006 Liang ............... G06K 19/07732 439/910
11,251,553 B2 * 2/2022 Yamashita ........... H01R 12/724
(Continued)

FOREIGN PATENT DOCUMENTS

JP H03-059673 U1 6/1991
JP H10-076528 A 3/1998
(Continued)

OTHER PUBLICATIONS

International Search Report issued on May 25, 2021 for WO 2021/177426 A1 (6 pages).

*Primary Examiner* — Renee S Luebke
(74) *Attorney, Agent, or Firm* — Venjuris, P.C.

(57) ABSTRACT

A connector device includes a circuit board, a connector, and a molded resin portion. The circuit board includes a conductive path. The connector includes a tubular housing made of resin and a terminal that protrudes from the inside of the housing to the outside of the housing in an axial direction of the housing and is connected to the conductive path. The molded resin portion collectively covers the circuit board, a portion of the terminal located outside the housing, and a portion of the housing. The housing includes a protrusion
(Continued)

that is provided over the entire circumference of the housing so as to be in contact with the molded resin portion. The protrusion includes a welded portion that is made of a constituent material of the housing and a constituent material of the molded resin portion welded to each other.

15 Claims, 4 Drawing Sheets

(58) Field of Classification Search
CPC .. H01R 13/5202; H01R 43/24; H01R 13/504; B23K 26/57; B29C 65/16
See application file for complete search history.

(56) References Cited

U.S. PATENT DOCUMENTS

| | | | | |
|---|---|---|---|---|
| 12,212,091 | B2 * | 1/2025 | Yamashita | .............. B29C 65/16 |
| 2020/0388945 | A1 * | 12/2020 | Yamashita | ......... H01R 13/5216 |

FOREIGN PATENT DOCUMENTS

| | | | | |
|---|---|---|---|---|
| JP | 4196546 | B2 * | 12/2008 | |
| JP | 4281178 | B2 * | 6/2009 | ........... G01L 19/003 |
| JP | 2010-040992 | A | 2/2010 | |
| JP | 2010-098097 | A | 4/2010 | |
| JP | 2014-103091 | A | 6/2014 | |
| JP | 2014-177051 | A | 9/2014 | |
| JP | 2014-194899 | A | 10/2014 | |
| JP | 2017-004698 | A | 1/2017 | |
| WO | 2016/084537 | A1 | 6/2016 | |
| WO | 2019/039244 | A1 | 2/2019 | |

* cited by examiner

CONNECTOR DEVICE

CROSS REFERENCE TO RELATED APPLICATIONS

This application is a national phase of PCT application No. PCT/JP2021/008562, filed on 4 Mar. 2021, which claims priority from Japanese patent application No. 2020-039412, filed on 6 Mar. 2020, all of which are incorporated herein by reference.

TECHNICAL FIELD

The present disclosure relates to a connector device.

This application claims priority from Japanese Patent Application No. 2020-039412 filed Mar. 6, 2020, which is hereby incorporated by reference herein.

BACKGROUND

Patent Document 1 discloses an electronic device in which a circuit board and a portion of a connector are housed in a casing. The casing is constituted by a case and a cover attached to the case. A seal member is interposed between the case and the cover to make an internal space of the casing a waterproof space. The electronic device will be hereinafter referred to as a connector device.

PRIOR ART DOCUMENT

Patent Document

Patent Document 1: JP 2017-004698 A

SUMMARY OF THE INVENTION

A connector device according to the present disclosure including: a circuit board; a connector; and a molded resin portion, wherein the circuit board includes a conductive path, the connector includes a tubular housing made of resin and a terminal that protrudes from the inside of the housing to the outside of the housing in an axial direction of the housing and is connected to the conductive path, the molded resin portion collectively covers the circuit board, a portion of the terminal located outside the housing, and a portion of the housing, the housing includes a protrusion that is provided over the entire circumference of the housing so as to be in contact with the molded resin portion, and the protrusion includes a welded portion that is made of a constituent material of the housing and a constituent material of the molded resin portion welded to each other.

DETAILED DESCRIPTION TO EXECUTE THE INVENTION

Figure 1:
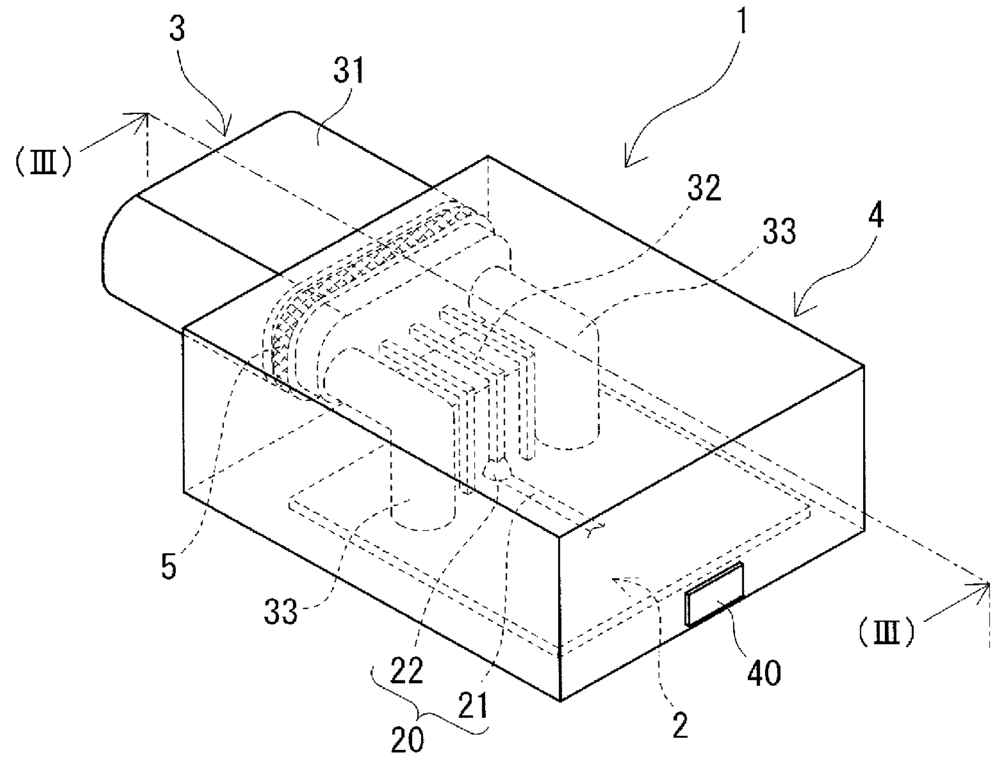
FIG. 1 is a perspective view schematically showing a connector device according to an embodiment.

Problem to be Solved by the Present Disclosure

The connector device described in Patent Document 1 includes the casing and therefore is large. Also, in the connector device described in Patent Document 1, the seal member is interposed between the case and the cover constituting the casing to ensure waterproof performance, and therefore, the number of components is large and the manufacture of the connector device is likely to be troublesome.

An object of the present disclosure is to provide a connector device that is small and easy to manufacture and moreover has excellent waterproof performance

Effects of the Present Disclosure

The connector device according to the present disclosure is small and easy to manufacture and has excellent waterproof performance.

Description of Embodiment of the Present Disclosure

First, aspects of implementation of the present disclosure will be listed and described.

(1) A connector device according to an aspect of the present disclosure including: a circuit board; a connector; and a molded resin portion, wherein the circuit board includes a conductive path, the connector includes a tubular housing made of resin and a terminal that protrudes from the inside of the housing to the outside of the housing in an axial direction of the housing and is connected to the conductive path, the molded resin portion collectively covers the circuit board, a portion of the terminal located outside the housing, and a portion of the housing, the housing includes a protrusion that is provided over the entire circumference of the housing so as to be in contact with the molded resin portion, and the protrusion includes a welded portion that is made of a constituent material of the housing and a constituent material of the molded resin portion welded to each other.

The connector device according to the present disclosure includes the welded portion in the protrusion provided over the entire circumference of the housing of the connector. Therefore, the connector device according to the present disclosure is excellent in adhesion between the housing and the molded resin portion over the entire circumference of the housing. Accordingly, the connector device according to the present disclosure can suppress intrusion of a liquid such as water through a gap between the housing and the molded resin portion. Since intrusion of a liquid can be suppressed, it is possible to suppress attachment of a liquid to the circuit board and conductive members such as the terminal, which are covered by the molded resin portion.

The welded portion is typically formed through laser welding. In the laser welding, the housing is irradiated with a laser beam via the molded resin portion to generate heat at the interface between the housing and the molded resin portion, and the constituent material of the housing and the constituent material of the molded resin portion are welded to each other using the generated heat. Here, the laser beam passes through the molded resin portion and is absorbed by the housing. The housing that has absorbed the laser beam generates heat, and the constituent material of the housing is melted by the generated heat. As a result of heat of fusion of the housing being transferred to the molded resin portion, the molded resin portion generates heat and is melted by the generated heat. The welded portion is formed by the molten constituent material of the housing and the molten constituent material of the molded resin portion.

The connector device according to the present disclosure includes the welded portion in the protrusion. That is, in the connector device according to the present disclosure, the welded portion is formed by generating heat in the protrusion using a laser beam. Since heat is generated in the protrusion, the heat is likely to be concentrated in the protrusion and a strong welded portion is likely to be formed. For the reasons described above, the connector device according to the present disclosure has excellent waterproof performance.

In the connector device according to the present disclosure, the circuit board and conductive members such as the terminal are covered by the molded resin portion. Therefore, there is no need to separately provide a casing for housing the conductive members in the connector device according to the present disclosure. Also, the connector device according to the present disclosure has excellent waterproof performance due to the welded portion as described above, and accordingly, there is no need to separately provide a seal member. Therefore, the number of components is small and a process of assembling the casing and a process of arranging the seal member can be omitted, and the connector device according to the present disclosure is excellent in productivity. For the reasons described above, the connector device according to the present disclosure is small and easy to manufacture.

(2) In an example of the connector device according to the present disclosure, the housing includes a plurality of recesses that are provided over the entire circumference of the housing so as to be in contact with the molded resin portion and are arranged in parallel with each other in the axial direction of the housing, and the protrusion constitutes side walls of the recesses that are adjacent to each other.

According to this aspect, the recesses are filled with the molded resin portion. Accordingly, the molded resin portion filling the recesses serves as an anchor, and the area of contact between the housing and the molded resin portion can be increased when compared with a case where the protrusion has the same height and the recesses are not provided. Therefore, according to this aspect, it is easy to improve adhesion between the housing and the molded resin portion.

Moreover, according to this aspect, the protrusion is formed by providing the recesses, and accordingly, a protruding length of the protrusion from the outer surface of the housing can be reduced when compared with a case where the recesses are not provided. Therefore, according to this aspect, it is easy to reduce the thickness of the molded resin portion from the outer surface of the housing, and it is easy to downsize the connector device.

(3) In an example of the connector device according to the present disclosure, the protrusion is provided so as to intersect a portion of the terminal located inside the housing.

The protrusion is provided over the entire circumference of the housing. That is, the protrusion is ring-shaped. According to this aspect, the terminal is arranged so as to pass through the inner circumferential side of the ring-shaped protrusion. In the case of this aspect, a portion of the housing from which the terminal protrudes is close to the protrusion. As described above, the welded portion is formed as a result of the constituent materials of the housing and the molded resin portion being welded to each other with heat. Since the connector device according to the present disclosure includes the welded portion in the protrusion, the heat can be concentrated in the protrusion. Accordingly, even when the portion of the housing from which the terminal protrudes is close to the protrusion, it is possible to suppress heat transfer to the terminal. Therefore, it is possible to suppress an adverse effect on the terminal and the circuit board connected to the terminal during formation of the welded portion. Moreover, since the welded portion is provided in the protrusion, it is easy to increase the distance between the terminal and the welded portion to some extent, when compared with a case where the protrusion is not provided. When the protrusion is not provided, it is conceivable to increase the thickness of the housing covering the terminal to increase the distance between the terminal and the welded portion to some extent. However, the amount of the constituent material of the housing increases in this case.

(4) In an example of the connector device according to the present disclosure, the protrusion includes a distal end surface that is parallel with the axial direction of the housing.

As described above, the welded portion is formed by generating heat in the protrusion using a laser beam. When the protrusion includes the distal end surface, it is easy to stably secure a surface of the protrusion that receives the laser beam. Also, when the protrusion includes the distal end surface, it is easy to provide, on the distal end side of the protrusion, a region in which heat is generated, and it is easy to suppress heat transfer to the proximal end side of the protrusion. Here, the axial direction of the housing is the longitudinal direction of the portion of the terminal located inside the housing.

(5) In an example of the connector device according to the present disclosure, a transverse section of the protrusion has a rectangular shape.

The molded resin portion is formed along the external shape of the housing. However, if the housing includes a portion with a complex shape, a gap may be formed between the molded resin portion and that portion. According to this aspect, the shape of the protrusion is simple. Therefore, according to this aspect, it is easy to improve adhesion between the protrusion and the molded resin portion. Also, according to this aspect, it is easy to form the protrusion.

(6) In an example of the connector device according to the present disclosure, the protrusion has a maximum width of 1 mm or more and less than 2 mm.

As described above, the welded portion is formed by generating heat in the protrusion using a laser beam. When the maximum width of the protrusion is within the above range, heat generated by the laser beam is likely to be concentrated in the protrusion.

(7) In an example of the connector device according to the present disclosure, the protrusion has a maximum height of 0.2 mm or more and 0.5 mm or less.

As described above, the welded portion is formed by generating heat in the protrusion using a laser beam. When the maximum height of the protrusion is within the above range, heat generated using the laser beam is likely to diffuse in a constant manner, and the protrusion is likely to melt in a constant manner.

(8) In an example of the connector device according to the present disclosure, the molded resin portion has a transmittance of 40% or more, the transmittance of the molded resin portion being a ratio (b1/a1)×100 between a light quantity a1 and a light quantity b1, the light quantity a1 being a light quantity of a laser beam having a wavelength of 940 nm, and the light quantity b1 being a light quantity of the laser beam that has passed through a test piece having a thickness of 2 mm and made of the constituent material of the molded resin portion.

As described above, the welded portion is formed through laser welding. If the molded resin portion has a transmittance of 40% or more, the laser beam is unlikely to be absorbed by the molded resin portion and is likely to reach a surface of the housing. Therefore, according to this aspect, it is easy to generate heat at the interface between the housing and the molded resin portion using the laser beam, and it is easy to form the welded portion.

(9) In an example of the connector device according to the present disclosure, the housing has a transmittance of 10% or less, the transmittance of the housing being a ratio (b2/a2)×100 between a light quantity a2 and a light quantity b2, the light quantity a2 being a light quantity of a laser beam having a wavelength of 940 nm, and the light quantity b2 being a light quantity of the laser beam that has passed through a test piece having a thickness of 2 mm and made of the constituent material of the housing.

As described above, the welded portion is formed through laser welding. If the housing has a transmittance of 10% or less, the laser beam is likely to be absorbed by the housing. Therefore, according to this aspect, it is easy to generate heat at the interface between the housing and the molded resin portion using the laser beam, and it is easy to form the welded portion.

(10) In an example of the connector device according to the present disclosure, the molded resin portion contains a polyamide resin or polyester.

The polyamide resin is superior in terms of mechanical strength, for example. Accordingly, a molded resin portion containing the polyamide resin is likely to mechanically protect members covered by the molded resin portion. Polyester is superior in terms of electrical insulation properties and waterproof properties, for example. Accordingly, a molded resin portion containing polyester is likely to electrically and chemically protect members covered by the molded resin portion.

(11) In an example of the connector device according to the present disclosure, the housing contains polyester.

According to this aspect, the terminal and the like are likely to be protected electrically and chemically.

(12) In an example of the connector device according to the present disclosure, both the molded resin portion and the housing contain polyester.

According to this aspect, the molded resin portion and the housing contain the same type of resin, and therefore, it is easy to make solubility parameters of the molded resin portion and the housing close to each other. Therefore, according to this aspect, the molded resin portion and the housing are highly conformable to each other. Therefore, the connector device according to this aspect has more excellent waterproof performance. Moreover, according to this aspect, the strength of the welded portion is likely to be increased due to the welded portion containing the same type of resin. Therefore, adhesion between the molded resin portion and the housing is further improved according to this aspect.

(13) In an example of the connector device according to the present disclosure, the molded resin portion includes a surface that is in contact with ambient air.

According to this aspect, the surface of the molded resin portion constitutes the outermost layer. That is, this aspect does not include a casing for housing the circuit board and the like. Therefore, it is easy to downsize the connector device according to this aspect.

(14) In an example of the connector device according to the present disclosure, the molded resin portion is an injection-molded article.

An injection-molded article can be produced through injection molding. In the injection molding, a mold is filled with the constituent material of the molded resin portion while pressure is applied, so as to cover the circuit board, the housing, and the like. Accordingly, when compared with cast molding, it is easy to fill every corner of the mold with the constituent material of the molded resin portion in the injection molding. Therefore, according to this aspect, a gap is unlikely to be formed between the molded resin portion and the circuit board or the housing. Since a gap is unlikely to be formed, water drops are unlikely to be generated through condensation of water vapor in a gap. Moreover, according to this aspect, the molded resin portion is formed through injection molding, and therefore the freedom in choosing the shape of the molded resin portion is high.

(15) In an example of the connector device according to the present disclosure, the circuit board and the connector constitute a control unit.

The connector device according to this aspect can be used for a long period of time because waterproof performance between the housing and the molded resin portion is high. Therefore, the connector device according to this aspect can be suitably used for a control unit. Moreover, the connector device according to this aspect is small, and therefore can be suitably used for a control unit.

Details of Embodiment of the Present Disclosure

Figure 3:
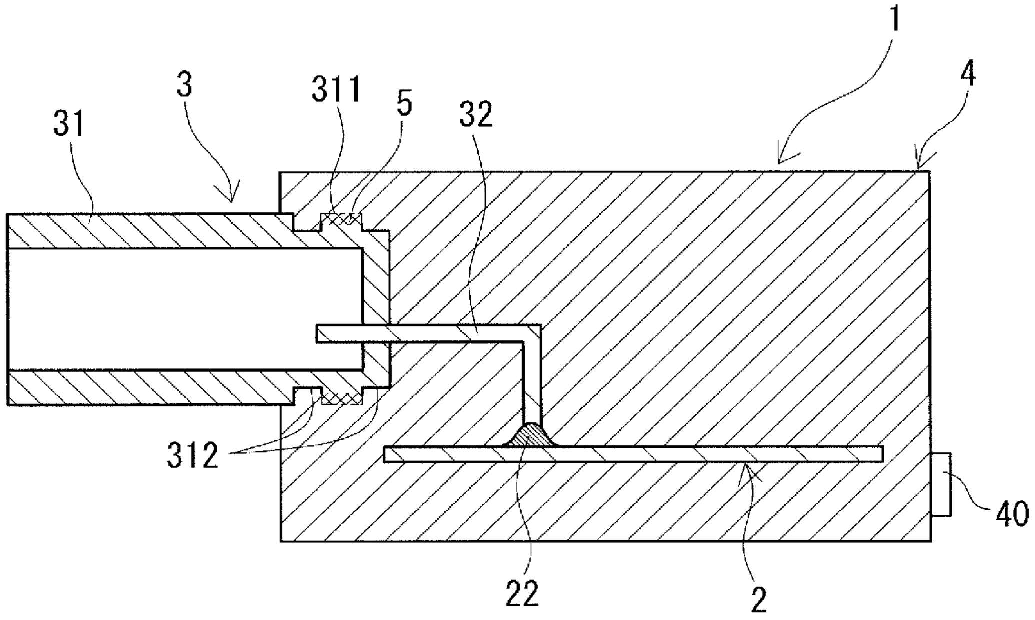
FIG. 3 is a cross-sectional view taken along line (III)-(III) in FIG. 1.

The following describes details of an embodiment of the present disclosure with reference to the drawings. FIG. 3 shows a cut surface of a connector device according to the embodiment, which is cut along a plane parallel with the longitudinal direction of a terminal included in a connector. The longitudinal direction of the terminal refers to the longitudinal direction of the terminal that is mostly located inside a housing, and is a direction parallel with an axial direction of the housing that is included in the connector and has a tubular shape. In each of the drawings, a welded portion is cross-hatched. The same reference numerals in the drawings denote portions having the same name <Connector Device>

Figure 2:
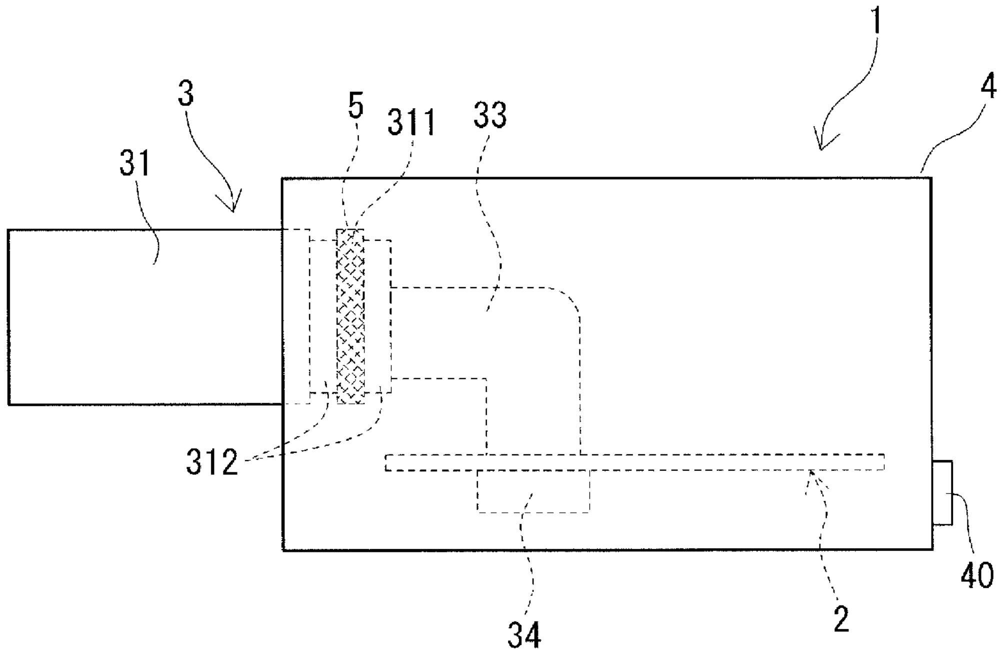
FIG. 2 is a side view schematically showing the connector device according to an embodiment.

A connector device 1 according to the embodiment includes a circuit board 2 and a connector 3 as shown in FIGS. 1 to 3. The circuit board 2 includes a conductive path 20. The connector 3 includes a housing 31 and a terminal 32. The housing 31 is made of resin and has a tubular shape. The terminal 32 protrudes to the outside of the housing 31 in an axial direction of the housing 31 and is connected to the conductive path 20. The connector device 1 according to the embodiment is characterized in including a molded resin portion 4 that collectively covers the circuit board 2, the portion of the terminal 32 located outside the housing 31, and a portion of the housing 31. Also, the connector device 1 according to the embodiment is characterized in that a protrusion 311 is provided over the entire circumference of the housing 31 in a portion thereof that is in contact with the molded resin portion 4, and the protrusion 311 includes a welded portion 5. The following describes each configuration in detail.

[Circuit Board]

The circuit board 2 is a plate-shaped member on which electronic components such as a semiconductor relay (not shown), the connector 3, and the like are mounted. A printed circuit board can be used as the circuit board 2. The circuit board 2 includes the conductive path 20. The conductive path 20 refers to portions of conductive members that constitute an electric circuit of the circuit board 2 and are exposed to the surface of the circuit board 2. The conductive path 20 includes, for example, a conductive pattern 21 formed on the circuit board 2, a terminal of an electronic component (not shown) mounted on the circuit board 2, and a solder 22 connecting the terminal of the electronic component or the terminal 32 of the connector 3 to the conductive pattern 21. The circuit board 2 is embedded in the molded resin portion 4, which will be described later.

[Connector]

The connector 3 is a connection member to which a mating connector (not shown) is connected. The mating connector is connected to in-vehicle electrical equipment or the like via a wire harness. The connector 3 is mounted on the circuit board 2. The connector 3 includes the housing 31 and the terminal 32. The connector 3 further includes an attachment portion 33 and a fixing member 34 (FIG. 2). The connector 3 is spaced apart from a plane in which the circuit board 2 extends. The connector 3 shown in FIGS. 1 to 3 is arranged above the circuit board 2.

<Housing>

The housing 31 is a tubular member into which the mating connector is fitted. The housing 31 has a bottomed tubular shape including a closed side opposite to an open side from which the mating connector is fitted. The terminal 32, which will be described later, passes through the closed side surface of the housing 31. That is, the terminal 32 is drawn out from the inside of the housing 31 to the outside thereof through the closed side surface. Hereinafter, the closed side surface may be referred to as a closed end surface. The portion of the terminal 32 located outside the housing 31 protrudes from the closed end surface. The closed end surface of the housing 31 and the vicinity of the closed end surface are embedded in the molded resin portion 4, which will be described later, over the entire circumference of the housing 31. As shown in FIG. 3, the housing 31 includes the protrusion 311 on the outer circumferential surface in the vicinity of the closed end surface. The protrusion 311 is also embedded in the molded resin portion 4.

<<Protrusion>>

The protrusion 311 is provided over the entire circumference of the housing 31. The protrusion 311 includes the welded portion 5, which will be described later. The welded portion 5 is typically formed through laser welding. The welded portion 5 is formed as a result of a constituent material of the housing 31 and a constituent material of the molded resin portion 4 being welded to each other using heat generated by a laser beam, as described later in detail. The protrusion 311 has a function of intensively absorbing heat from the laser beam during formation of the welded portion 5. The shape and dimensions of the protrusion 311 do not substantially change between before and after the laser welding.

The housing 31 of this example includes a plurality of recesses 312 that are provided over the entire circumference of the housing 31 and arranged in parallel with each other in the axial direction of the housing 31. The protrusion 311 constitutes side walls of adjacent recesses 312. In this example, two recesses 312 are provided.

The shape of the protrusion 311 can be selected as appropriate such that the protrusion 311 can intensively absorb heat from a laser beam. The protrusion 311 preferably includes a distal end surface 311*s* (FIG. 4) that is parallel with the axial direction of the housing 31. The axial direction of the housing 31 is the same as the longitudinal direction of a portion of the terminal 32 located inside the housing 31 (FIG. 3). When the protrusion 311 includes the distal end surface 311*s*, it is easy to stably secure a surface of the protrusion 311 that receives a laser beam. Also, when the protrusion 311 includes the distal end surface 311*s*, it is easy to provide, on the distal end side of the protrusion 311, a region in which heat is generated by the laser beam, and it is easy to suppress heat transfer to the proximal end side of the protrusion 311.

Figure 4:
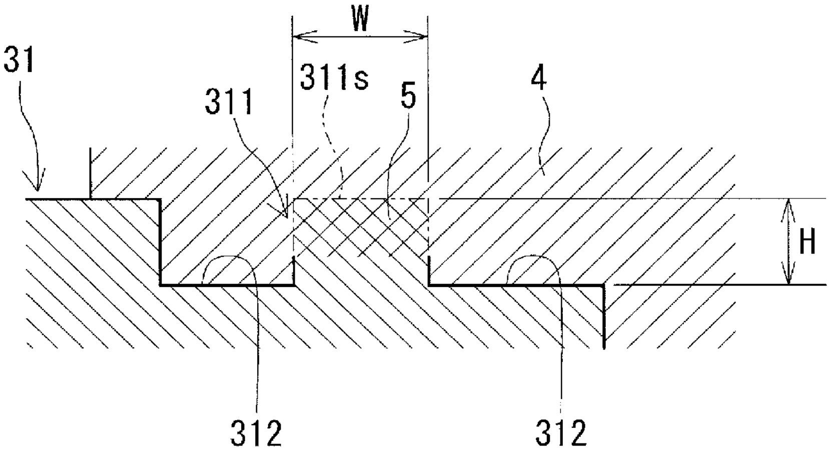
FIG. 4 is a partially enlarged cross-sectional view showing a protrusion and the vicinity of the protrusion shown in FIG. 3 in an enlarged scale.

There is no particular limitation on the shape of a transverse section of the protrusion 311. The transverse section may have a rectangular shape as shown in FIG. 4, for example. The shape of a transverse section of the protrusion 311 is the shape of a cut surface that is cut in a direction orthogonal to the direction in which the protrusion 311 extends. The protrusion 311 protrudes in a radial direction of the housing 31. In the configuration in which the protrusion 311 extends in the circumferential direction of the housing 31, the protrusion 311 may be provided along the circumferential direction of the housing 31 or may be curved in the manner of a wave or the like deviating from the circumferential direction of the housing 31. When the transverse section of the protrusion 311 has a rectangular shape, the shape of the protrusion 311 is simple and it is easy to improve adhesion between the protrusion 311 and the molded resin portion 4. Also, when the transverse section of the protrusion 311 has a rectangular shape, it is easy to form the protrusion 311.

The protrusion 311 preferably has a maximum width W (FIG. 4) of 1 mm or more and less than 2 mm. When the maximum width W of the protrusion 311 is 1 mm or more, it is easy to secure the surface that receives a laser beam, and heat from the laser beam is likely to be concentrated on the protrusion 311. On the other hand, when the maximum width W of the protrusion 311 is less than 2 mm, heat from the laser beam is likely to be concentrated on the protrusion 311, although this depends on the intensity distribution of the laser beam. The maximum width W of the protrusion 311 is more preferably 1 mm or more and 1.7 mm or less, and particularly preferably 1 mm or more and 1.5 mm or less, for example.

The protrusion 311 preferably has a maximum height H (FIG. 4) of 0.2 mm or more and 0.5 mm or less. When the maximum height H of the protrusion 311 is 0.2 mm or more, it is easy to provide, on the distal end side of the protrusion 311, a region in which heat is generated by a laser beam, and it is easy to suppress heat transfer to the proximal end side of the protrusion 311. On the other hand, when the maximum height H of the protrusion 311 is 0.5 mm or less, heat generated by a laser beam is likely to diffuse in a constant manner and the constituent material of the protrusion 311 is likely to melt in a constant manner. The maximum height H of the protrusion 311 is more preferably 0.2 mm or more and 0.4 mm or less, and particularly preferably 0.2 mm or more and 0.3 mm or less, for example.

Figure 5:
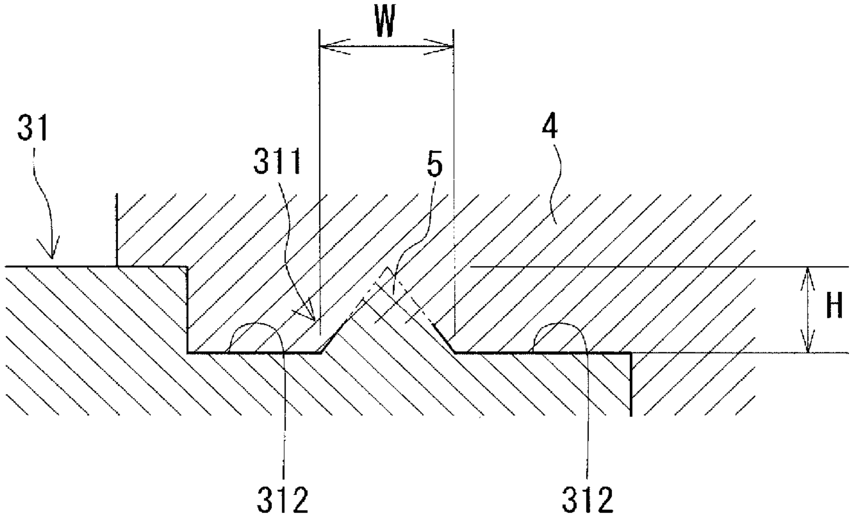
FIG. 5 is a cross-sectional view showing another example of the protrusion included in the connector device according to an embodiment.
Figure 6:
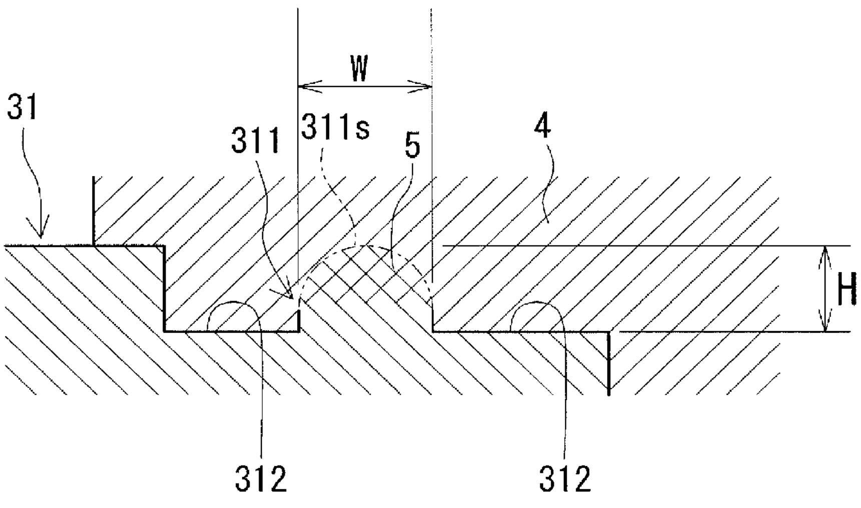
FIG. 6 is a cross-sectional view showing another example of the protrusion included in the connector device according to an embodiment.

The transverse section of the protrusion 311 may have a triangular shape as shown in FIG. 5. Alternatively, the transverse section of the protrusion 311 may have a semicircular shape in which the distal end surface 311*s* is constituted by an arcuate surface as shown in FIG. 6. Alternatively, the transverse section of the protrusion 311 may have a trapezoidal shape (not shown). Also, the transverse section of the protrusion 311 may have an inverted trapezoidal shape (not shown) of which the width decreases from the distal end side toward the proximal end side.

As shown in FIG. 3, the protrusion 311 is provided so as to intersect the portion of the terminal 32 located inside the housing 31. The protrusion 311 is provided over the entire circumference of the housing 31. That is, the protrusion 311 is ring-shaped. Accordingly, the portion of the terminal 32 located inside the housing 31 is arranged so as to pass through the inner circumferential side of the ring-shaped protrusion 311. In this case, the closed end surface, which is a portion of the housing 31 from which the terminal 32 protrudes, is close to the protrusion 311. Even in this case, the terminal 32 and the circuit board 2 connected to the terminal 32 can be kept from being adversely affected by heat from a laser beam because the heat is concentrated on the protrusion 311.

Among the plurality of recesses 312, a recess 312 that is located on the closed end surface side of the housing 31 is constituted by a notch that is continuous to the closed end surface. The closed end surface side of the housing 31 is the right side in FIG. 3. Among the plurality of recesses 312, a recess 312 that is located on the open side of the housing 31 is constituted by a groove that has side walls on two sides. The open side of the housing 31 is the left side in FIG. 3.

The depth of the recesses 312 in this example is equal to the maximum height of the protrusion 311. When the protrusion 311 is formed by providing such recesses 312, a protruding length of the protrusion 311 from the outer surface of the housing 31 can be reduced when compared with a case where the recesses 312 are not provided. When the protruding length of the protrusion 311 from the outer surface of the housing 31 is small, it is easy to reduce the thickness of the molded resin portion 4 from the outer surface of the housing 31, and it is easy to downsize the connector device.

The recesses 312 are filled with the molded resin portion 4. Accordingly, the molded resin portion 4 filling the recesses 312 serves as an anchor, and the area of contact between the housing 31 and the molded resin portion 4 can be increased when compared with a case where the protrusion 311 has the same height and the recesses 312 are not provided. Therefore, when the recesses 312 are provided, adhesion between the housing 31 and the molded resin portion 4 is likely to be improved.

The number of recesses 312 may be three or more. In such a case, two protrusions 311 are provided in parallel with each other in the axial direction of the housing 31. A configuration is also possible in which a single recess 312 is provided. In such a case, one side wall of the protrusion 311 is constituted by a side wall of the recess 312, and the other side wall of the protrusion 311 is constituted by the closed end surface of the housing 31. A configuration is also possible in which no recess 312 is provided. In such a case, the protrusion 311 protrudes from the outer surface of the housing 31.

<<Transmittance>>

The housing 31 preferably has a low transmittance. The transmittance of the housing 31 is a ratio $(b2/a2)\times100$ between a light quantity a2 of a laser beam having a wavelength of 940 nm and a light quantity b2 of the laser beam that has passed through a test piece having a thickness of 2 mm and made of the constituent material of the housing 31. A housing 31 having a low transmittance absorbs the laser beam well. That is, the housing 31 having a low transmittance can be easily melted by the laser beam. Accordingly, it is easy to form the welded portion 5, which will be described later. The transmittance of the housing 31 is preferably 10% or less, for example. If the housing 31 has a transmittance of 10% or less, the housing 31 absorbs the laser beam well and can be easily melted, and accordingly, it is easy to form the welded portion 5. The transmittance of the housing 31 is more preferably 7% or less, and particularly preferably 5% or less. The housing 31 preferably has an opaque black or grey color, for example. These colors absorb the laser beam well.

<<Material>>

The housing 31 preferably contains polyester, for example. Polyester is superior in terms of electrical insulation properties and waterproof properties, for example. Accordingly, a housing 31 containing polyester is likely to protect the terminal 32 and the like located inside the housing 31 mechanically, electrically, and chemically. A representative example of polyester is polybutylene terephthalate (PBT). Preferably, the housing 31 further contains a colorant. Examples of the colorant include colorants that reduce the transmittance of the housing 31. The colorant may be carbon black, for example. When carbon black is contained, the color of the housing 31 is likely to be black.

<Terminal>

The terminal 32 electrically connects the mating connector and the circuit board 2 to each other. The terminal 32 is drawn out from the inside of the housing 31 to the outside thereof by passing through the closed end surface of the housing 31. The portion of the terminal 32 located inside the housing 31 extends along the axial direction of the housing 31. One end of the terminal 32 located inside the housing 31 is electrically connected to the mating connector. The portion of the terminal 32 located outside the housing 31 is bent so as to extend toward the circuit board 2. The terminal 32 in this example is constituted by a metal wire that is bent substantially at a right angle. The other end of the terminal 32 located outside the housing 31 is electrically connected to the conductive pattern 21 on the circuit board 2. The solder 22 can be used to electrically connect the other end of the terminal 32 to the conductive pattern 21. The terminal 32 may be a press-fit terminal. In such a case, the terminal 32 is electrically connected to the conductive pattern 21 through press fitting. Accordingly, the solder 22 can be omitted in the case where the terminal 32 is a press-fit terminal. The other end of the terminal 32 passes through the circuit board 2. The portion of the terminal 32 located outside the housing 31 is embedded in the molded resin portion 4.

<Attachment Portion>

The attachment portion 33 is provided so as to constitute a single piece together with the housing 31. In this example, the attachment portion 33 is molded as a portion of the housing 31. The attachment portion 33 is bent into an L-shape so as to extend from the closed end surface of the housing 31 toward the circuit board 2. The attachment portion 33 in this example is constituted by a round bar member that is bent substantially at a right angle. In this example, two attachment portions 33 are provided sandwiching the terminal 32. A screw hole is formed in an end surface of each attachment portion 33. The fixing member 34, which will be described later, is attached to the screw hole. The circuit board 2 is sandwiched between the end surface of the attachment portion 33 and the fixing member 34, and thus the circuit board 2 and the housing 31 are fixed. The attachment portions 33 are embedded in the molded resin portion 4.

<Fixing Member>

The fixing member 34 fixes the housing 31 to the circuit board 2. A screw can be used as the fixing member 34, for example. The fixing member 34 in this example is constituted by a resin screw. In this example, two fixing members 34 are respectively inserted into insertion holes (not shown) formed in the circuit board 2 and are attached to the attachment portions 33. As a result of the fixing members 34 being attached to the attachment portions 33, the housing 31 is fixed to the circuit board 2. Portions of the fixing members 34 protrude from a surface of the circuit board 2. The fixing members 34 are embedded in the molded resin portion 4.

[Molded Resin Portion]

The molded resin portion 4 protects the circuit board 2 and conductive members such as the terminal 32 mechanically, electrically, and chemically from an external environment. The molded resin portion 4 collectively covers the circuit board 2, the portion of the terminal 32 located outside the housing 31, and a portion of the housing 31. In this example, the molded resin portion 4 collectively covers the circuit board 2 and most part of the connector 3. The most part of the connector 3 refers to a region of the connector 3 excluding the open side end portion of the housing 31 from which the mating connector is fitted.

The molded resin portion 4 includes a surface that is in contact with ambient air. The surface being in contact with ambient air means that the connector device 1 is not covered by a case or the like but is exposed and the surface constitutes the outermost surface of the connector device 1. In this example, the entire surface of the molded resin portion 4 is in contact with ambient air. That is, the connector device 1 does not include a case. Therefore, the connector device 1 is small.

<<Transmittance>>

The molded resin portion 4 preferably has a high transmittance. The transmittance of the molded resin portion 4 is a ratio $(b1/a1)\times 100$ between a light quantity a1 of a laser beam having a wavelength of 940 nm and a light quantity b1 of the laser beam that has passed through a test piece having a thickness of 2 mm and made of the constituent material of the molded resin portion 4. A molded resin portion 4 having a high transmittance is unlikely to absorb the laser beam and facilitates passage of the laser beam to the housing 31. Accordingly, it is easy to form the welded portion 5, which will be described later. The transmittance of the molded resin portion 4 is preferably 40% or more, for example. A molded resin portion 4 having a transmittance of 40% or more facilitates passage of the laser beam therethrough, and accordingly, it is easy to form the welded portion 5. The transmittance of the molded resin portion 4 is more preferably 45% or more, and particularly preferably 50% or more. The molded resin portion 4 is preferably colorless and transparent, or has a transparent white color or an opaque white color, for example. These colors facilitate passage of the laser beam therethrough.

<<Material>>

The molded resin portion 4 preferably contains a polyamide resin or polyester, for example. The polyamide resin is superior in terms of mechanical strength, for example. Accordingly, a molded resin portion 4 containing the polyamide resin is likely to mechanically protect the members covered by the molded resin portion 4. Polyester is superior in terms of electrical insulation properties and waterproof properties, for example. Accordingly, a molded resin portion 4 containing polyester is likely to electrically and chemically protect the members covered by the molded resin portion 4.

It is preferable that the housing 31 and the molded resin portion 4 contain the same type of resin. It is particularly preferable that the housing 31 and the molded resin portion 4 are constituted by the same resin. If the housing 31 and the molded resin portion 4 contain the same type of resin, it is easy to make solubility parameters of the housing 31 and the molded resin portion 4 close to each other. Therefore, the housing 31 and the molded resin portion 4 are highly conformable to each other. Moreover, the strength of the welded portion 5, which will be described later, is likely to be increased when the welded portion 5 contains the same type of resin. Accordingly, adhesion between the housing 31 and the molded resin portion 4 is further improved. For example, when the housing 31 contains polyester, it is preferable that the molded resin portion 4 contains polyester.

The molded resin portion 4 is preferably an injection-molded article. An injection-molded article can be produced through injection molding. In the injection molding, a mold is filled with the constituent material of the molded resin portion 4 while pressure is applied, so as to cover the circuit board 2, the housing 31, and the like. Accordingly, when compared with cast molding, it is easy to fill every corner of the mold with the constituent material of the molded resin portion 4 in the injection molding. Therefore, when compared with a cast-molded article, a gap is unlikely to be formed between the molded resin portion 4 and the circuit board 2, the housing 31, and the like in the injection-molded article. Since a gap is unlikely to be formed, water drops are unlikely to be generated through condensation of water vapor in a gap. Moreover, when the molded resin portion 4 is an injection-molded article, the freedom in choosing the shape of the molded resin portion 4 is high.

The constituent material of the molded resin portion 4 preferably has a melting point of 180° C. or more and 200° C. or less. If the melting point of the material is 180° C. or more, it is possible to prevent the molded resin portion 4 from melting and deforming when the connector device 1 is used. On the other hand, if the melting point of the material is 200° C. or less, it is possible to set a molding temperature during injection molding to 200° C. or less to prevent the solder 22 and the like from melting at the molding temperature.

The molded resin portion 4 is an injection-molded article, and accordingly includes a gate mark portion 40. The gate mark portion 40 is formed at a position corresponding to a gate for injecting the constituent material of the molded resin portion 4 into a cavity of the mold during molding of the molded resin portion 4. When the molded resin portion 4 is produced through injection molding, an attached portion that includes a portion corresponding to the gate is formed in the molded resin portion 4. The gate mark portion 40 is formed in the molded resin portion 4 as a result of the attached portion being removed. The attached portion may also include a portion corresponding to a sprue, and further include a portion corresponding to a runner, in addition to the portion corresponding to the gate. The attached portion can be removed by being snapped off, for example. The gate of the injection molding is preferably set at a position spaced apart from the housing 31 because the terminal 32 and the like are arranged around the housing 31. Accordingly, the gate mark portion 40 is preferably provided on the side of the molded resin portion 4 opposite to the housing 31.

Welded Portion

As shown in FIG. 4, the welded portion 5 is made of the constituent material of the housing 31 and the constituent material of the molded resin portion 4 welded to each other. The materials being welded to each other means that at least one of the following is satisfied: the materials are mixed with each other; the materials are in a compatible state; rather than an interface fracture, a material fracture occurs due to a shear force; and the surface of the connector 3 is roughened. An interface fracture refers to a fracture that occurs at the interface between the housing 31 and the molded resin portion 4. Accordingly, the housing 31 and the molded resin portion 4 separate from each other along the interface. Therefore, the constituent material of one of the housing 31 and the molded resin portion 4 does not attach to the other of the housing 31 and the molded resin portion 4. A material fracture refers to a fracture that occurs inside one of the housing 31 and the molded resin portion 4. Accordingly, the two members separate from each other with the constituent material of one member attached to a surface of the other member facing the one member. Adhesion between the housing 31 and the molded resin portion 4 can be improved by the welded portion 5.

The welded portion 5 is formed in the protrusion 311 provided on the housing 31. As described above, the protrusion 311 is provided over the entire circumference of the housing 31. Accordingly, the welded portion 5 is also provided over the entire circumference of the housing 31. Therefore, it is possible to suppress intrusion of a liquid such as water through a gap between the housing 31 and the molded resin portion 4. Accordingly, it is possible to suppress attachment of a liquid to the circuit board 2 and conductive members such as the terminal 32.

[Uses]

The connector device 1 according to the embodiment can be suitably used for an engine control unit of an automobile, a module in an electric braking system of an automobile, and the like. Examples of the engine control unit include a fuel injection engine control unit (FI-ECU). Examples of the module in the electric braking system include modules of an electro mechanical brake (EMB) and an electronic parking brake (EPB).

<Method for Manufacturing Connector Device>

The connector device 1 described above can be manufactured through a step of preparing an assembly including the circuit board 2 and the connector 3, a step of forming a one-piece body by covering a portion of the prepared assembly with the molded resin portion 4, and a step of irradiating the one-piece body with a laser beam.

[Step of Preparing Assembly]

In the step of preparing an assembly, an assembly in which the circuit board 2 and the connector 3 described above are connected to each other is prepared. In the assembly, the conductive pattern 21 on the circuit board 2 is electrically connected to the terminal 32 of the connector 3 using the solder 22. Also, in the assembly, the attachment portions 33 of the connector 3 are fixed to the circuit board 2 using the fixing members 34.

[Step of Forming One-Piece Body]

In the step of forming a one-piece body, the circuit board 2, the portion of the terminal 32 located outside the housing 31 of the connector 3, and a portion of the housing 31 are collectively covered by the molded resin portion 4. That is, in the step of forming a one-piece body, most part of the assembly excluding the opening of the housing 31 of the connector 3 into which the mating connector is to be fitted is covered by the molded resin portion 4. The molded resin portion 4 covers the protrusion 311 provided on the housing 31 and fills the recesses 312.

[Step of Irradiating One-Piece Body with Laser Beam]

In the step of irradiating the one-piece body with a laser beam, the protrusion 311 provided on the housing 31 is irradiated with a laser beam via the molded resin portion 4 to weld the constituent material of the housing 31 and the constituent material of the molded resin portion 4 to each other. The laser beam is emitted from the outside of the molded resin portion 4 in the normal direction of the outer circumferential surface of the housing 31, for example. The laser beam passes through the molded resin portion 4 and is absorbed by the housing 31. The housing 31 that has absorbed the laser beam generates heat, and the constituent material of the housing 31 is melted by the generated heat. As a result of heat of fusion of the housing 31 being transferred to the molded resin portion 4, the molded resin portion 4 generates heat and is melted by the generated heat. The welded portion 5 is formed as a result of the molten constituent material of the housing 31 and the molten constituent material of the molded resin portion 4 solidifying in a state of adhering to each other.

Conditions of the laser irradiation can be selected as appropriate. Examples of the laser source include a solid laser, a semiconductor laser, and a fiber laser. The wavelength of the laser beam may be 800 nm or more and 990 nm or less, 850 nm or more and 990 nm or less, or 930 nm or more and 950 nm or less, for example. The wavelength of the laser beam is preferably 940 nm. The laser output can be selected according to the materials of the housing 31 and the molded resin portion 4, and may be 10 W or more and 100 W or less, 20 W or more and 90 W or less, or 30 W or more and 60 W or less, for example.

It is possible to perform laser irradiation while scanning the housing 31 in the circumferential direction, for example. The scanning speed of the laser beam can be selected according to the materials, thicknesses, and shapes of the housing 31 and the molded resin portion 4, and may be 5 mm/min or more and 50 mm/min or less, 10 mm/min or more and 40 mm/min or less, or 20 mm/min or more and 30 mm/min or less, for example. In addition, the entire circumference of the housing 31 may be irradiated with a laser at a time. In this case, a plurality of laser sources are arranged in the circumferential direction of the housing 31 and laser irradiation is performed simultaneously. The laser irradiation is preferably performed in a state where the molded resin portion 4 is pressed against the housing 31. In this case, adhesion between the molded resin portion 4 and the housing 31 is likely to be improved.

<Effects>

The connector device 1 according to the embodiment has the following effects.

(1) The connector device has excellent waterproof performance. This is because adhesion between the housing 31 and the molded resin portion 4 can be improved by the welded portion 5, and accordingly, it is easy to suppress intrusion of a liquid through a gap between the housing 31 and the molded resin portion 4. In particular, the welded portion 5 is formed by generating heat in the protrusion 311 using a laser beam, and accordingly, it is easy to concentrate the heat generated using the laser beam in the protrusion, and a strong welded portion 5 is likely to be formed. Therefore, it is possible to suppress attachment of a liquid to the circuit board 2 and conductive members such as the terminal 32, which are covered by the molded resin portion 4.

(2) The connector device can be easily downsized. The circuit board 2 and conductive members such as the terminal 32 are collectively covered by the molded resin portion 4, and accordingly, there is no need to separately provide a casing for housing the circuit board 2 and the like. Since the casing is not provided, there is no need to provide a seal member for waterproofing a gap in the casing.

(3) The connector device is easy to manufacture. The connector device 1 according to the embodiment has excellent waterproof performance due to the welded portion 5, and accordingly, a casing and a seal member are unnecessary as described above. Therefore, the number of components is small and it is possible to omit a process of assembling the casing and a process of arranging the seal member.

Test Examples

Figure 7:
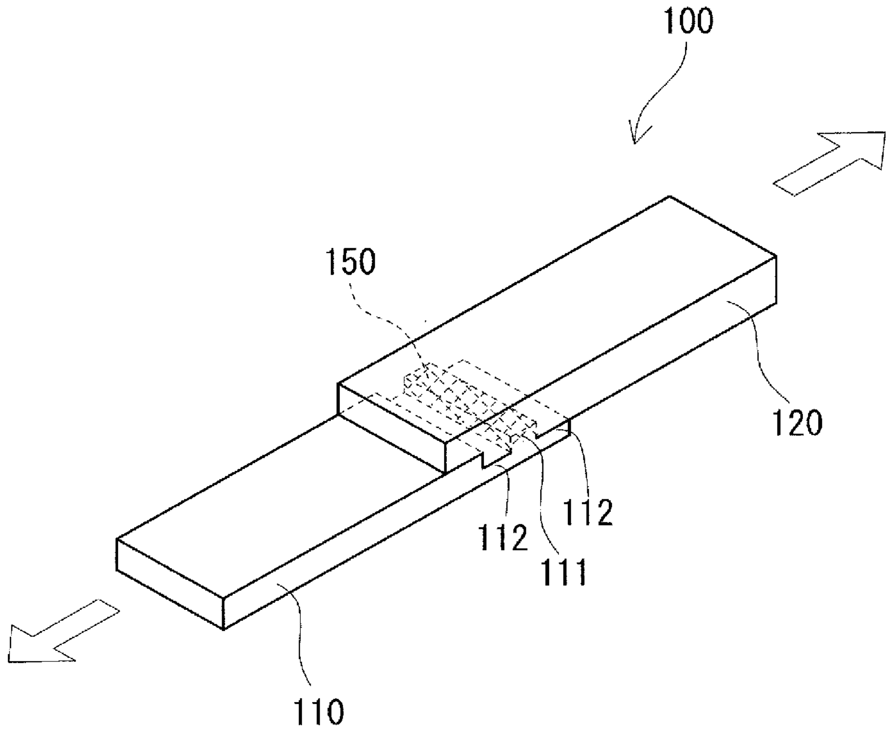
FIG. 7 is a perspective view showing a test piece used in a tensile shear test for evaluating adhesive performance.

Connector devices each including a welded portion in a protrusion provided on a housing were produced, and a difference in adhesive performance due to a difference in the shape or size of the protrusion was examined. The adhesive performance was evaluated using a test piece 100 shown in FIG. 7. The test piece 100 is a member produced by simulating a joint portion between the housing of the connector and the molded resin portion.

<Test Piece>

[Samples No. 1-1 to No. 1-5]

An absorbent material 110 was prepared by simulating a portion of the housing joined to the molded resin portion. The absorbent material 110 was made of a PBT resin having a transmittance of 1%. The absorbent material 110 was a plate material having a length of 80 mm, a width of 25 mm, and a thickness of 1 mm. A protrusion 111 and recesses 112 were provided in a surface of the absorbent material 110 in the vicinity of an end portion of the absorbent material 110. Specifically, a notch that was continuous to an end surface of the absorbent material 110 and a groove portion extending in parallel with the notch were provided as the recesses 112 in the width direction of the absorbent material 110. The protrusion 111 was provided along the width direction of the absorbent material 110 so as to constitute side walls of the notch and the groove portion. A transverse section of the protrusion 111 had a rectangular shape like that shown in FIG. 4. The width W and the height H of the protrusion 111 (FIG. 4) are shown in Table 1. The height H of the protrusion 111 was adjusted by adjusting the depth of the recesses 112 such that a distal end of the protrusion 111 did not protrude from the surface of the absorbent 110.

A transmitting material 120 was formed through injection molding so as to cover the protrusion 111 and the recesses 112 of the prepared absorbent material 110. The transmitting material 120 was made of a thermoplastic polyester resin having a transmittance of 40%. VYLOSHOT (registered trademark) manufactured by TOYOBO CO., LTD., was used as the thermoplastic polyester resin. The transmitting material 120 was formed so as to be in contact with the surface of the absorbent material 110 in which the protrusion 111 and the recesses 112 were provided and to extend along the longitudinal direction of the absorbent material 110. The transmitting material 120 had a length of 80 mm, a width of 25 mm, and a thickness of 1 mm from the surface of the absorbent material 110. The length of an area in which the absorbent material 110 and the transmitting material 120 overlapped each other was 10 mm.

The protrusion 111 provided on the absorbent material 110 was irradiated with a laser beam via the transmitting material 120. The laser beam was emitted from above the transmitting material 120 in the normal direction of the surface of the absorbent material 110. The laser irradiation was performed over the entire region in the width direction of the protrusion 111 at a time while the transmitting material 120 was pressed against the absorbent material 110. The transmitting material 120 was pressed with a pressure of 0.1 MPa. The laser beam had a spot diameter of 1.5 mm. The laser beam had a wavelength of 940 nm. As a result, a welded portion 150 was formed in a distal end portion of the protrusion 111.

[Samples No. 2-1 to No. 2-3]

Compared with the samples No. 1-1 to No. 1-5, the shape and size of the protrusion 111 were changed in samples No. 2-1 to No. 2-3. The shape of a transverse section of the protrusion 111 was a triangular shape like that shown in FIG. 5. The width W and the height H of the protrusion 111 (FIG. 5) are shown in Table 1. Conditions other than the shape and size of the protrusion 111 were the same as those for the samples No. 1-1 to No. 1-5.

[Samples No. 3-1 and No. 3-2]

Compared with the samples No. 1-1 to No. 1-5, the shape and size of the protrusion 111 were changed in samples No. 3-1 and No. 3-2. The shape of a transverse section of the protrusion 111 was a semicircular shape like that shown in FIG. 6. The width W and the height H of the protrusion 111 (FIG. 6) are shown in Table 1. Conditions other than the shape and size of the protrusion 111 were the same as those for the samples No. 1-1 to No. 1-5.

[Sample No. 100]

In sample No. 100, the protrusion 111 was not provided on the absorbent material 110. In the sample No. 100, a region in which the absorbent material 110 and the transmitting material 120 overlapped each other was irradiated with a laser beam over the entire region in the width direction of the absorbent material 110 and the transmitting material 120 at a time. Conditions other than the protrusion 111 were the same as those for the samples No. 1-1 to No. 1-5.

<Evaluation of Adhesive Performance>

With respect to the test piece 100 of each of the obtained samples, a tensile shear test was performed to evaluate adhesive performance. Autograph AGS-X Series manufactured by SHIMADZU CORPORATION was used as a test device in the tensile shear test. In the tensile shear test, the absorbent material 110 and the transmitting material 120 were pulled away from each other in the length direction as indicated by outlined arrows shown in FIG. 7, and a maximum tensile stress at the time when the absorbent material 110 and the transmitting material 120 separated from each other was measured. The measurement was performed five times for each sample. Average values of the maximum tensile stress are shown in Table 1.

Also, joined surfaces of the absorbent material 110 and the transmitting material 120 were visually observed. As a result, it was found that a material fracture occurred in the welded portion 150 in all of the samples. A material fracture occurred inside one of the absorbent material 110 and the transmitting material 120, and the constituent material of the one of the absorbent material 110 and the transmitting material 120 attached to the surface of the other of the absorbent material 110 and the transmitting material 120 separated from the one of the absorbent material 110 and the transmitting material 120.

TABLE 1

| | Protrusion | | | Maximum tensile |
|---|---|---|---|---|
| Sample No. | Shape | Width W (mm) | Height H (mm) | stress (MPa) |
| 1-1 | Rectangle | 1.0 | 1.0 | 4.27 |
| 1-2 | | 1.0 | 0.2 | 4.60 |

TABLE 1-continued

| | | Protrusion | | Maximum tensile |
|---|---|---|---|---|
| Sample No. | Shape | Width W (mm) | Height H (mm) | stress (MPa) |
| 1-3 | | 1.5 | 1.0 | 2.53 |
| 1-4 | | 1.5 | 0.5 | 2.71 |
| 1-5 | | 1.5 | 0.2 | 2.67 |
| 2-1 | Triangle | 1.0 | 1.0 | 3.09 |
| 2-2 | | 1.5 | 1.0 | 2.15 |
| 2-3 | | 1.5 | 0.5 | 2.12 |
| 3-1 | Semicircle | 1.0 | 1.0 | 3.08 |
| 3-2 | | 1.5 | 1.0 | 2.12 |
| 100 | — | — | — | 1.87 |

As shown in Table 1, in the samples No. 1-1 to No. 1-5, No. 2-1 to No. 2-3, No. 3-1, and No. 3-2, which included the protrusion, the maximum tensile stress was 2.00 MPa or more, and the adhesive performance was superior to that of the sample No. 100, which did not include the protrusion. It is thought that in the cases where the protrusion was provided, heat generated by the laser beam was concentrated in the protrusion and a strong welded portion was formed in the protrusion.

As for the shape of the protrusion, when the samples No. 1-1, No. 2-1, and No. 3-1 are compared, the adhesive performance of the sample No. 1-1 in which the protrusion had a rectangular shape was superior to those of the samples No. 2-1 and No. 3-1 in which the protrusion had a triangular shape or a semicircular shape. Also, when the samples No. 1-3, No. 2-2, and No. 3-2 are compared, the adhesive performance of the sample No. 1-3 in which the protrusion had a rectangular shape was superior to those of the samples No. 2-2 and No. 3-2 in which the protrusion had a triangular shape or a semicircular shape. It is thought that in the cases where the protrusion had a rectangular shape, it was easy to bring the absorbent material and the transmitting material into close contact with each other, a surface for receiving the laser beam could be stably secured, and a stronger welded portion was formed in the protrusion.

As for the width of the protrusion, when the samples No. 1-1 and No. 1-3 are compared, the adhesive performance of the sample No. 1-1 in which the width of the protrusion was small was superior to that of the sample No. 1-3 in which the width of the protrusion was large. Also, when the samples No. 2-1 and No. 2-2 are compared, the adhesive performance of the sample No. 2-1 in which the width of the protrusion was small was superior to that of the sample No. 2-2 in which the width of the protrusion was large. Also, when the samples No. 3-1 and No. 3-2 are compared, the adhesive performance of the sample No. 3-1 in which the width of the protrusion was small was superior to that of the sample No. 3-2 in which the width of the protrusion was large. It is thought that in the cases where the width of the protrusion was small, a surface for receiving the laser beam could be stably secured irrespective of the spot diameter of the laser beam, and a stronger welded portion was formed in the protrusion.

As for the height of the protrusion, when the samples No. 1-1 and No. 1-2 are compared, there is no large difference in the adhesive performance. Also, when the samples No. 1-3, No. 1-4, and No. 1-5 are compared, there is no large difference in the adhesive performance. Here, the samples No. 1-3, No. 1-4, and No. 1-5 were examined regarding variation in the maximum tensile stress. The measurement was performed five times for each sample, and a variation in the maximum tensile stress measured five times was determined. As a result, it was found that the smaller the height of the protrusion was, the smaller the variation was. It is thought that when the height of the protrusion is small, heat generated by the laser beam is likely to diffuse in a constant manner, and accordingly, the constituent material of the protrusion melted in a constant manner. Note that it is thought the heat from the laser beam is likely to be concentrated in the protrusion when the height of the protrusion is 0.2 mm or more.

The present invention is not limited to these examples, but is defined by the claims, and is intended to encompass all modifications within the meanings and scope that are equivalent to the claims.

LIST OF REFERENCE NUMERALS

1 Connector device
2 Circuit board
20 Conductive path
21 Conductive pattern
22 Solder
3 Connector
31 Housing
311 Protrusion
311*s* Distal end surface
312 Recess
32 Terminal
33 Attachment portion
34 Fixing member
4 Molded resin portion
40 Gate mark portion
5 Welded portion
100 Test piece
110 Absorbent material
111 Protrusion
112 Recess
120 Transmitting material
150 Welded portion
W Width
H Height

What is claimed is:

1. A connector device comprising:

a circuit board;

a connector; and a molded resin portion, wherein the circuit board includes a conductive path, the connector includes:

a tubular housing made of resin and including a closed side opposite to an open side to which a mating connector is fitted; and a terminal that protrudes from the inside of the housing to the outside of the housing in an axial direction of the housing and is connected to the conductive path, the molded resin portion collectively covers the circuit board, a portion of the terminal located outside the housing, and a portion of the housing, a protrusion protrudes in a radial direction of the housing over the entire circumference of the housing in a region adjacent to the closed side so as to be in contact with the molded resin portion, and a welded portion is formed on the protrusion and is made of a constituent material of the housing and a constituent material of the molded resin portion welded to each other.

2. The connector device according to claim 1, wherein the housing includes a plurality of recesses that are provided over the entire circumference of the housing so as to be in contact with the molded resin portion and are arranged in parallel with each other in the axial direction of the housing, and the protrusion constitutes side walls of the recesses that are adjacent to each other.

3. The connector device according to claim 1, wherein the protrusion is provided in a direction intersecting a longitudinal direction of the terminal located inside the housing.

4. The connector device according to claim 1, wherein the protrusion includes a distal end surface that is parallel with the axial direction of the housing.

5. The connector device according to claim 1, wherein a transverse section of the protrusion has a rectangular shape.

6. The connector device according to claim 1, wherein the protrusion has a width of 1 mm or more and less than 2 mm.

7. The connector device according to claim 1, wherein the protrusion has a height of 0.2 mm or more and 0.5 mm or less.

8. The connector device according to claim 1, wherein the molded resin portion has a transmittance of 40% or more, the transmittance of the molded resin portion being a ratio (b1/a1)×100 between a light quantity a1 and a light quantity b1, the light quantity a1 being a light quantity of a laser beam having a wavelength of 940 nm, and the light quantity b1 being a light quantity of the laser beam that has passed through a test piece having a thickness of 2 mm and made of the constituent material of the molded resin portion.

9. The connector device according to claim 1, wherein the housing has a transmittance of 10% or less, the transmittance of the housing being a ratio (b2/a2)×100 between a light quantity a2 and a light quantity b2, the light quantity a2 being a light quantity of a laser beam having a wavelength of 940 nm, and the light quantity b2 being a light quantity of the laser beam that has passed through a test piece having a thickness of 2 mm and made of the constituent material of the housing.

10. The connector device according to claim 1, wherein the molded resin portion contains a polyamide resin or polyester.

11. The connector device according to claim 1, wherein the housing contains polyester.

12. The connector device according to claim 1, wherein both the molded resin portion and the housing contain polyester.

13. The connector device according to claim 1, wherein the molded resin portion includes a surface that is in contact with ambient air.

14. The connector device according to claim 1, wherein the molded resin portion is an injection-molded article.

15. The connector device according to claim 1, wherein the circuit board and the connector constitute a control unit.

* * * * *